(12) United States Patent
Damron

(10) Patent No.: US 7,194,389 B2
(45) Date of Patent: Mar. 20, 2007

(54) FUSION OF DATA FROM DIFFERING MATHEMATICAL MODELS

(75) Inventor: James J. Damron, Alexandria, VA (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 722 days.

(21) Appl. No.: 10/395,168

(22) Filed: Mar. 25, 2003

(65) Prior Publication Data
US 2003/0154060 A1 Aug. 14, 2003

(51) Int. Cl.
*G06F 7/22* (2006.01)
(52) U.S. Cl. .................. 703/2; 701/200; 382/284; 382/293
(58) Field of Classification Search ............. 703/2, 703/6; 701/200; 382/284, 293
See application file for complete search history.

(56) References Cited

U.S. PATENT DOCUMENTS

| | | | |
|---|---|---|---|
| 4,899,293 A | | 2/1990 | Dawson et al. |
| 5,189,424 A | * | 2/1993 | Brown ................ 342/25 C |
| 5,652,717 A | * | 7/1997 | Miller et al. ............. 703/6 |
| 5,675,407 A | | 10/1997 | Geng |
| 5,729,451 A | | 3/1998 | Gibbs et al. |
| 5,831,573 A | * | 11/1998 | Muir ..................... 701/214 |
| 5,907,568 A | * | 5/1999 | Reitan, Jr. ............. 342/26 B |
| 5,923,278 A | | 7/1999 | Poehler et al. |
| 5,926,581 A | * | 7/1999 | Pritt ....................... 382/294 |
| 6,009,185 A | * | 12/1999 | DeAngelis et al. ......... 382/107 |
| 6,016,118 A | * | 1/2000 | Jackson et al. ......... 342/357.06 |
| 6,424,287 B1 | | 7/2002 | Doerry et al. |
| 2002/0089446 A1 | * | 7/2002 | Diggelen et al. ...... 342/357.13 |
| 2003/0081812 A1 | * | 5/2003 | Yamamoto et al. ......... 382/103 |
| 2004/0138815 A1 | * | 7/2004 | Li et al. ...................... 702/2 |

OTHER PUBLICATIONS

M. E. Hodgson, J. R. Jensen, L. Schmidt, S. Schill, and B. Davis, An evaluation of LIDAR- and IFSAR -derived digital elevation models in leaf-on conditions with USGS Level 1 and Level 2 DEMs, pp. 295-308, 2002 Elsevier Science Inc.*
D. B. Zilkoski, NOAA Technical Memorandum NOS NGS-58,pp. 1-22, Nov. 1997.*

(Continued)

*Primary Examiner*—Kamini Shah
*Assistant Examiner*—Kibrom K. Gebresilassie
(74) *Attorney, Agent, or Firm*—Earl H. Baugher, Jr.

(57) ABSTRACT

A procedure automatically resolves vertical differences commonly found when merging and combining Digital Elevation Models (DEMs) from different collection and production systems. These systems may employ technologies used in single pass Interferometric Synthetic Aperture Radar (IFSAR), LIght Detection And Ranging (LIDAR), and photogrammetry, as well as DEMs derived from contour based elevation data and GPS point data. This procedure employs sophisticated software checking routines for automatically identifying horizontal and vertical datums used by the differing systems as well as any geoid models employed by them. Normally, all of these sources use different vertical datums and may use different horizontal datums. A preferred embodiment of the present invention automatically recognizes the vertical datums, including those that are associated with the geoid models and the 3-D datums that conventional GIS does not support at present.

11 Claims, 4 Drawing Sheets

OTHER PUBLICATIONS

James J. Damron and Carlton Daniel, "Evaluating IFSAR and LIDAR Technologies Using ArcInfo: Red River Pilot Study," Jul. 2000.*

James J. Damron, and Carlton Daniel, "Evaluating IFSAR and LIDAR Technologies Using ArcInfo: Red River Pilot Study," ,herein referred as Daniels, Jul. 2000, total pages of 122.*

J. Chen, Using ARC/INFO on Strauss, University of Delaware 1997, pp. 1-12.*

M. J. Amos, and W. E. Featherstone. "Development of a gravimetric geoid for New Zealand and a single Vertical datum." Western Australian Centre for Geodesy.*

Damron, James J,; "Techniques for Digital Elevation Model (DEM) Fusion Using ARC/INFO: Using IFSAR /and LIDAR DEM Data," U.S. Army Topographic Engineering Center, Alexandria, VA 22315-3864, Jan. 21, 1999.

Damron, James J. and Carlton Daniel; "Evaluating IFSAR and LIDAR Technologies Using ArcInfo: Red River Pilot Study," ERDC/TEC TR-01--2, Topographic Engineering Center, Alexandria, VA, Jul. 2000.

* cited by examiner

FUSION OF DATA FROM DIFFERING MATHEMATICAL MODELS

STATEMENT OF GOVERNMENT INTEREST

Under paragraph 1(a) of Executive Order 10096, the conditions under which this invention was made entitle the Government of the United States, as represented by the Secretary of the Army, to an undivided interest in any patent granted thereon by the United States. This and related patents are available for licensing. Please contact Jeff Walaszek at 703 428-6724 or Phillip Stewart at 601 634-4113.

FIELD OF THE INVENTION

The present invention relates generally to manipulating digital data from two sources, each in a different format. In particular, it involves automatically fusing data from multiple digital elevation models (DEMs) having formats differing one from the other.

BACKGROUND

A digital elevation model (DEM) is a digital file consisting of a sampled array of terrain elevations for ground positions at regularly spaced horizontal intervals. Thus, a DEM is the topographic data composed of the set of horizontal coordinates (x, y) and its elevation (z) for each grid cell in a given region. Building a DEM is done in three steps: (1) an image-matching step to find overlapped regions from stereo images, (2) a camera-modeling step to obtain coordinates (x,y,z) from the results of the image-match using a camera model that relates the photo plane with absolute ground coordinates, and (3) an interpolation step to change the uneven horizontal distribution resulting from the camera model into a uniform horizontal square distribution (cells).

The USGS Digital Elevation Model (DEM) data files are digital representations of cartographic information in a raster form. The USGS produces five different digital elevation products. Although all are identical in the manner the data are structured, each varies in sampling interval, geographic reference system, areas of coverage, and accuracy. The primary differing characteristic is the spacing, or sampling interval, of the data.

DEMs may be used in the generation of three-dimensional graphics displaying terrain slope, aspect (direction of slope), and terrain profiles between selected points. At the USGS, DEMs have been used in combination with digital raster graphics (DRGs), digital line graphs (DLGs), and digital orthophoto quadrangles (DOQs) to both enhance the visual information for data extraction and revision purposes and to create aesthetically pleasing and dramatic hybrid digital images. Non-graphic applications such as modeling terrain and gravity data for use in the search for energy resources, calculating the volume of proposed reservoirs, and determining landslide probability have also been developed.

A DEM file is organized into a series of three records, A, B, and C. The A record contains information defining the general characteristics of the DEM, including its name, boundaries, units of measurement, minimum and maximum elevations, number of B records, and projection parameters. Each B record consists of an elevation profile with associated header information, and the C record contains accuracy data. Each file contains a single A and C record, while there is a separate B record for each elevation profile. More detailed information about the organization of a DEM file can be found in the National Mapping Program Technical Instructions, Standards for Digital Elevation Models and Digital Elevations Models: Data User's Guide.

The USGS plans to convert its DEM products to the Spatial Data Transfer Standard (SDTS) format. SDTS offers a mechanism for transferring data between dissimilar computer systems and offers the advantages of flexibility, improved quality, and no loss of information. It is the transfer mechanism for all Federal agencies.

These digital cartographic/geographic data files are produced by the U.S. Geological Survey (USGS) as part of the National Mapping Program. Currently, any Geographic Information System (GIS) supports Digital Elevation Model (DEM) data only as a 2-D system. DEMs may be projected using only 2-D horizontal datums (x, y), i.e., a GIS does not support vertical (z) datums (orthometric height) and geoid models used to derive them. Additionally, various datums may be derived from different ellipsoid and geoid models.

Point and vector positioning using GPS provides height data as a perpendicular distance from a reference ellipsoid, e.g., the WGS84 ellipsoid. However, elevation is measured by perpendicular distance from a geoid (a proxy for sea level) above a local datum that may comprise coordinates for locations that have been surveyed.

A body rotating with the Earth experiences its gravitational attraction (and that of other celestial bodies) and a centrifugal force due to Earth's rotation about its axis. This produces a gravitational force vector $g(x,y,z)$ that may be described as a sum of a gravitational field and a centrifugal potential field. This sum defines a set of equipotential surfaces, defined by:

$$W(x,y,z) = \text{a constant} \quad (1)$$

on each of which surfaces the magnitude of the vector, g, is constant. Each of these equipotential surfaces is known as a geoid. A. Leick, *GPS Satellite Surveying*, John Wiley & Sons, New York, Second Edition, 1995, pp. 215–232. Because the local gravitational attraction will differ for a location near a mountain range and a location with no topographic relief, a geoid surface is not smooth everywhere and has bumps or undulations.

Real-time kinematic (RTK) GPS allows one to determine a set of parameters that relate measured or stored WGS84 heights above the ellipsoid to local control elevations, or benchmarks. This models the relationship between the local vertical datum and the ellipsoid as an inclined plane with parameters that describe the location and orientation of a best fitting plane.

To determine the precise range from an Earth-based receiver to a satellite, a reference coordinate system is chosen such that the instantaneous location of the satellite and the receiver are expressed in a uniform coordinate system. GPS uses a Cartesian, Earth-centered, Earth-fixed, coordinate system in which the positive x-axis points in the direction of 0° latitude, the positive y-axis points in the direction of 90° east longitude, and the resultant xy-plane defines Earth's equatorial plane. To transform Cartesian coordinates into the latitude, longitude and height coordinates of the receiver, a physical model of Earth is adopted. This model is based on an oblate ellipsoid having a semi-major axis length, a, and a semi-minor axis length, b, with $b \leq a$. The values for the lengths a and b are chosen to most nearly match a mean sea level, or geoid, surface. One such ellipsoid is the WGS84 ellipsoid. Leick, p. 487. Other ellipsoids include the Bessel 1841, Clarke 1880, International 1924, Krassowsky 1940, and GRS80 ellipsoids. In some instances, a "local" ellipsoid that better matches a local region is used in place of the WGS84 or other global ellipsoid.

Local or global geodetic coordinates are sufficient to define horizontal coordinates. However, vertical coordinates are referenced to a geoid vice an ellipsoid. By definition, the ellipsoid has a smooth shape. The shape of the selected geoid is influenced by the mass distribution in the Earth, and by the resulting local gravity gradient and any variations therein. In regions where the distribution of mass is homogeneous and the gravity variation is negligible, the difference between the geoid surface and the ellipsoid surface may be adequately represented by a vertical offset, normal to the ellipsoid surface. In regions where the gravity variation is non-negligible but constant, the difference between the geoid surface and the ellipsoid surface is better represented by a selected vertical offset and selected tilt angles along two orthogonal axes, i.e., a vertical plane adjustment. However, in regions where the distribution of the Earth's mass is non-homogeneous or where survey measurements are performed over large spatial distances, large fluctuation in the gravity gradients can occur, and the planar model relating height relative to the geoid and the ellipsoid degrades in accuracy. For example, on the plains of Kansas, a planar model might be sufficient for a 10,000 kilometer$^2$ (Km$^2$) project area, whereas at the foot of the Rocky Mountains a planar model may provide only a good approximation on a 10 Km$^2$ project area. For this reason, different models may be deemed appropriate for use as DEMs for even small areas of interest.

A number of patents address data fusion problems related to topography, some of which may be useful as inputs to a process representing a preferred embodiment of the present invention. Among these are:

U.S. Pat. No. 4,899,293, Method of Storage and Retrieval of Digital Map Data Based Upon a Tessellated Geoid System, to Dawson et al., Feb. 6, 1990, incorporated herein by reference. The '293 patent provides a method for storage and retrieval of digital map data representative of a tessellated sphere.

U.S. Pat. No. 5,729,451, Apparatus and Method for Fusing Diverse Data, to Gibbs et al., Mar. 17, 1998, incorporated herein by reference. The '451 patent describes an improved data fusion station that may have a number of uses including geo-technical engineering.

U.S. Pat. No. 5,652,717, Apparatus and Method for Collecting, Analyzing and Presenting Geographical Information, to Miller et al., Jul. 29, 1997, incorporated herein by reference. The '717 patent provides a process for manipulating geographic information from a variety of sources on a generic GIS.

U.S. Pat. No. 5,675,407, Color Ranging Method for High Speed Low-Cost Three Dimensional Surface Profile Measurement, to Geng, Oct. 7, 1997, incorporated herein by reference. The '407 patent uses a unique "color ranging" method to depict and manipulate elevation data.

U.S. Pat. No. 5,923,278, Global Phase Unwrapping of Interferograms, to Poehler et al., Jul. 13, 1999, incorporated herein by reference. The '278 patent provides a unique process for unwrapping a wrapped phased array data set representative of an interferogram.

U.S. Pat. No. 5,926,581, System for Topographic Mapping from Remotely Sensed Images, to Pritt, Jul. 20, 1999, incorporated herein by reference. The '581 patent employs images of terrain generated at different angles to supply matching points that are then used to develop coefficients of a coefficient mapping equation. A height term of the equation is corrected into an elevation term in the coordinates of one of the images. The elevation is then rotated into the coordinates of the ground plane of the terrain to result in a DEM.

U.S. Pat. No. 6,016,118, Real Time Integration of a Geoid Model into Surveying Activities, to Jackson et al., Jan. 18, 2000, incorporated herein by reference. The '118 patent enhances the elevation accuracy from a GPS-developed survey through use of an optimal locally-best-fitting plane combined with a local geoid model.

U.S. Pat. No. 6,424,287 B1, Error Correction for IFSAR, to Doerry et al., Jul. 23, 2002, incorporated herein by reference. The '287 patent improves elevation estimates by compensating for variations in vertical separation between antenna collection surfaces by adjusting the baseline projection during image projection.

Conventionally, any transformation of the horizontal and vertical datums of differing sources is handled manually. By employing any raster-based GIS, a process is needed to accurately and automatically merge into a "new merged" DEM two or more different DEMs based in different vertical datums (and possibly different horizontal datums) from various ellipsoid and geoid models. It is also preferable that the process automatically provides, as a decision design, software checking routines for both horizontal and vertical datums as well as for any geoid models used. A preferred embodiment of the present invention does this, yielding true 3-D objects in a 3-D environment.

SUMMARY

The present invention automatically resolves vertical offsets commonly found when merging and combining DEMs from different collection and production systems, such as technologies used in single pass Interferometric Synthetic Aperture Radar (IFSAR), LIght Detection And Ranging (LIDAR), photogrammetry, and DEMs derived from contour based elevation data and Global Positioning System (GPS) point data.

As an example, synthetic aperture radar (SAR) uses an antenna looking to the side of a path along which a vehicle is moving. It produces high resolution two-dimensional radar images.

Interferometric SAR (IFSAR) extends traditional two-dimensional SAR processing to three dimensions by manipulating data on the phase difference between two SAR images taken from different elevation positions to determine an angle of arrival for each pixel in the scene. This angle and the two-dimensional location information in the traditional SAR image are transformed into accurate geographic coordinates, including height information, if the position and motion parameters of the two antennas are known accurately.

IFSAR uses a pair of antennas that are rigidly mounted with respect to each other. The two antennas collect at least two channels of data from many positions along a path. An image is formed by using range and azimuth information to compute a complex SAR image for each antenna, and then cross correlating these images on a pixel-by-pixel basis. The phase difference between corresponding pixels is attributed to target height, and a phase-unwrapping process may be used to resolve ambiguities.

Normally, all of these collectors use different vertical datums and may use different horizontal datums. A preferred embodiment of the present invention recognizes vertical datums (z) that are associated with geoid models and 3-D datums that GIS does not support at present.

The present invention is used to automatically merge two or more multi-resolution DEMs that have differing horizontal and vertical datums with various ellipsoid and geoid models associated with the DEM data. These multiple DEMs are merged two at a time into a single common model. A preferred embodiment of the present invention also facilitates updating DEM data to newer horizontal and vertical datums for a true "recycling" capability.

A preferred embodiment of the present invention provides a process for automatically merging data from two differing mathematical models at a time. Each of these models incorporates one each horizontal and vertical datums. At least one of either the horizontal or vertical datums differ between the two mathematical models, most likely the vertical datum. The vertical datums for each model are commonly incorporated in a geoid model.

The process begins by importing the two differing mathematical models into a geographic information system (GIS). The next step is to determine automatically the horizontal and vertical datums employed by each of the differing mathematical models.

These datums are then projected to a three-dimensional (3-D) datum made common for both models. The geoid model used for the vertical datum of each model is then determined automatically.

Next to be determined automatically is the amount of separation between equivalent data points within sets of data points corresponding to the differing datums in each model. Determining the separation automatically may be accomplished by implementing a difference function defined by DEM 1–DEM 2 or by first comparing the first and second models to GPS data collected for the geographic area of interest and then correcting the first model to match the second model. Alternatively, the second model may be corrected to match the first model.

A correction is then applied automatically to a first set of corresponding data points of one of the models based on the amount of separation, while retaining unchanged the values for the second set of corresponding data points of the other model. This correction automatically adjusts for vertical offset between the models. Using GIS commands, these datums are then fused into a third model incorporating data from the corrected first of the differing models and data representing the unchanged second of the mathematical models. Either model may be selected as the first model, i.e., the one to be corrected for vertical offset.

In a preferred embodiment, the models are digital elevation models (DEMs), identified as DEM 1 and DEM 2. Sources of data used to build the DEMs may be selected from the group consisting essentially of: LIDAR, IFSAR, synthetic aperture radar (SAR), side-looking radar (SLR), ground mapping radar, ground penetrating radar, an infrared spectrum sensor array, an ultraviolet spectrum sensor array, a visible spectrum sensor array, and combinations thereof.

To verify the suitability of the process, an accuracy and confidence assessment is implemented automatically. This may include providing Global Positioning System (GPS) data for a geographic area in which the models overlap. At least one pre-specified statistical algorithm is then applied to this data automatically, comparing the provided GPS data to the third model. To assure uniformity of the data, the GPS data are collected in accordance with the National Oceanic and Atmospheric Administration (NOAA) Technical Memorandum NOS NGS-58, *Guidelines for Establishing GPS-Derived Ellipsoid Heights (Standards: 2-cm and 5-cm)*, Version 4.3, November 1997.

A preferred accuracy for the GPS data is 2-cm accuracy. At least one geoid model incorporating ellipsoid heights may be added to the third model automatically to facilitate deriving orthometric heights relative to a vertical datum.

Possible applications include updating older DEM data sets of local, county, and state governments, and United States federal agencies as well as those of foreign governments. Further, GIS users are able to access improved hydrologic and hydraulic analysis for flood plain mapping where DEM data are required.

Advantages of the present invention include:
providing an ability to update existing models by automatically merging newer data having a differing format;
reducing the need for additional collection because the formats of existing data are not compatible;
automatically providing provisions for quality control of data;
reducing cost of mapping; and
increasing efficiency in employing previously collected data.

Further advantages of the present invention will be apparent from the description below with reference to the accompanying drawings, in which like numbers indicate like elements.

DETAILED DESCRIPTION

Figure 1:
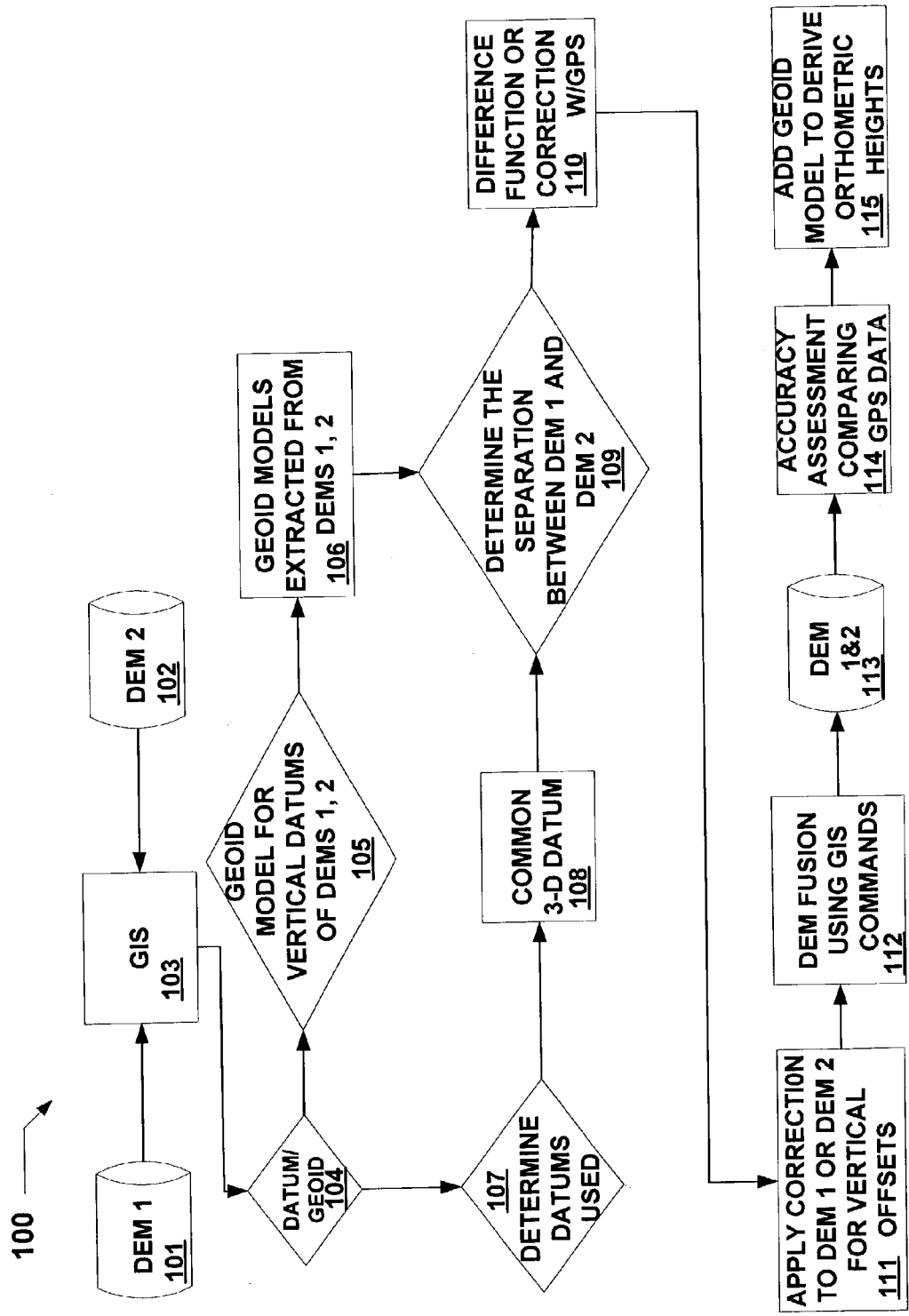
FIG. 1 is a flow diagram representing a preferred embodiment of the present invention.

Refer to FIG. 1 illustrating a method for implementing a preferred embodiment 100 of the present invention for merging multi-resolution gridded and non-gridded digital elevation data from two sources, DEM 1 101 and DEM 2 102. These sources, DEM 1 101 and DEM 2 102, employ vertical datums that differ one from the other, else the present invention would not be needed to merge these data. Their respective horizontal datums may also differ one from the other. The preferred embodiment 100 of the present invention automatically establishes an acceptable vertical accuracy upon merging the differing elevation data from DEM 1 101 and DEM 2 102. Elevation data to build the DEMs 101, 102 may be obtained from any raster-based GIS software.

Again referring to FIG. 1, the process begins by importing into the GIS 103 multi-resolution DEMs, for example, a Light Detection and Ranging (LIDAR) DEM as DEM 1 101 and an Interferometric Synthetic Aperture Radar (IFSAR) DEM as DEM 2 102.

The next step 104 is an automatic examination, or decision, step that automatically leads to determining the horizontal and vertical datums and geoid models used for the DEM 1 101 and DEM 2 102. After examining these specifics, this step branches into two determination phases 105, 107.

The first phase 105 automatically determines the geoid model used for the vertical datum in each DEM and extracts it from each DEM 101, 102. The second phase 107 automatically determines which datums were used for each DEM 101, 102 and projects this to a common three-dimensional (3-D) datum 108.

The third step 109 automatically determines the separation between the DEM 1 101 and DEM 2 102, either by using GPS data to correct 110 for the separation or by employing the difference function 110, DEM 1–DEM 2.

Once the separation is determined, a correction 111 is applied automatically to either the DEM 1 101 or DEM 2 102 to correct for vertical offset.

Next, DEM fusion 112 is implemented automatically by using GIS commands to merge the DEM 1 101 and DEM 2 102 into the new DEM 1&2 113.

A DEM accuracy assessment 114 is then implemented automatically, for example, GPS data are collected and compared for the area in which DEM 1 101 and DEM 2 102 overlap. This GPS data may be provided at 10-cm accuracy, preferably at 5-cm accuracy, and more preferably at 2-cm accuracy. To assure an accepted basis of comparison, these data should be collected in accordance with the NOAA Technical Memorandum NOS NGS-58.

Any of various statistical algorithms may be applied automatically to these GPS data 114 and the DEM 1&2 113 to determine a range of accuracy and a level of confidence.

Finally, a geoid model 115 incorporating ellipsoid heights may be added automatically to the DEM 1&2 113 to derive orthometric heights, such as provided by North American Vertical Datum (NAVD) 88. The process may be applied to all types of DEM data and works within any GIS capable of performing raster-based GIS.

EXAMPLE

The purpose of data fusion is to find the best mix of data types and resolutions based on what is available to draw from for your intended purpose. One notable purpose is floodplain mapping. Using a preferred embodiment of the present invention, data fusion automatically provides a robust new DEM from two or more separate DEMs that may have differing resolution. This data fusion methodology may be employed with any raster-based GIS that supports masking and merging routines within its embedded software. Two examples are ARCINFO® available from Environmental Systems Research Institute (ESRI) and ERDAS® available from Leica Geosystems.

A "manual" evaluation of two imaging technologies, IFSAR and LIDAR, was done for portions of the Red River floodplain in Northeast North Dakota and Canada. Damron, J. J. and C. Daniel, *Evaluating IFSAR and LIDAR Technologies Using ArcInfo: Red River Pilot Study,* U.S. Army Corps of Engineers, Engineer Research and Development Center, Topographic Engineering Center, ERDC/TEC TR-01-2, Alexandria, Va., July 2000.

Using the GRIDINSERT command of ARCINFO®, data fusion was executed manually in this example, replacing a 7-step process previously used. Damron, J. J., *Techniques for Digital Elevation Model (DEM) Fusion Using ARCINFO®: Using IFSAR and LIDAR DEM Data,"Second Conference on GIS Applications of Remote Sensing for Disaster Management*, The George Washington University, Washington, D.C., Jan. 19–21, 1999.

Figure 2:
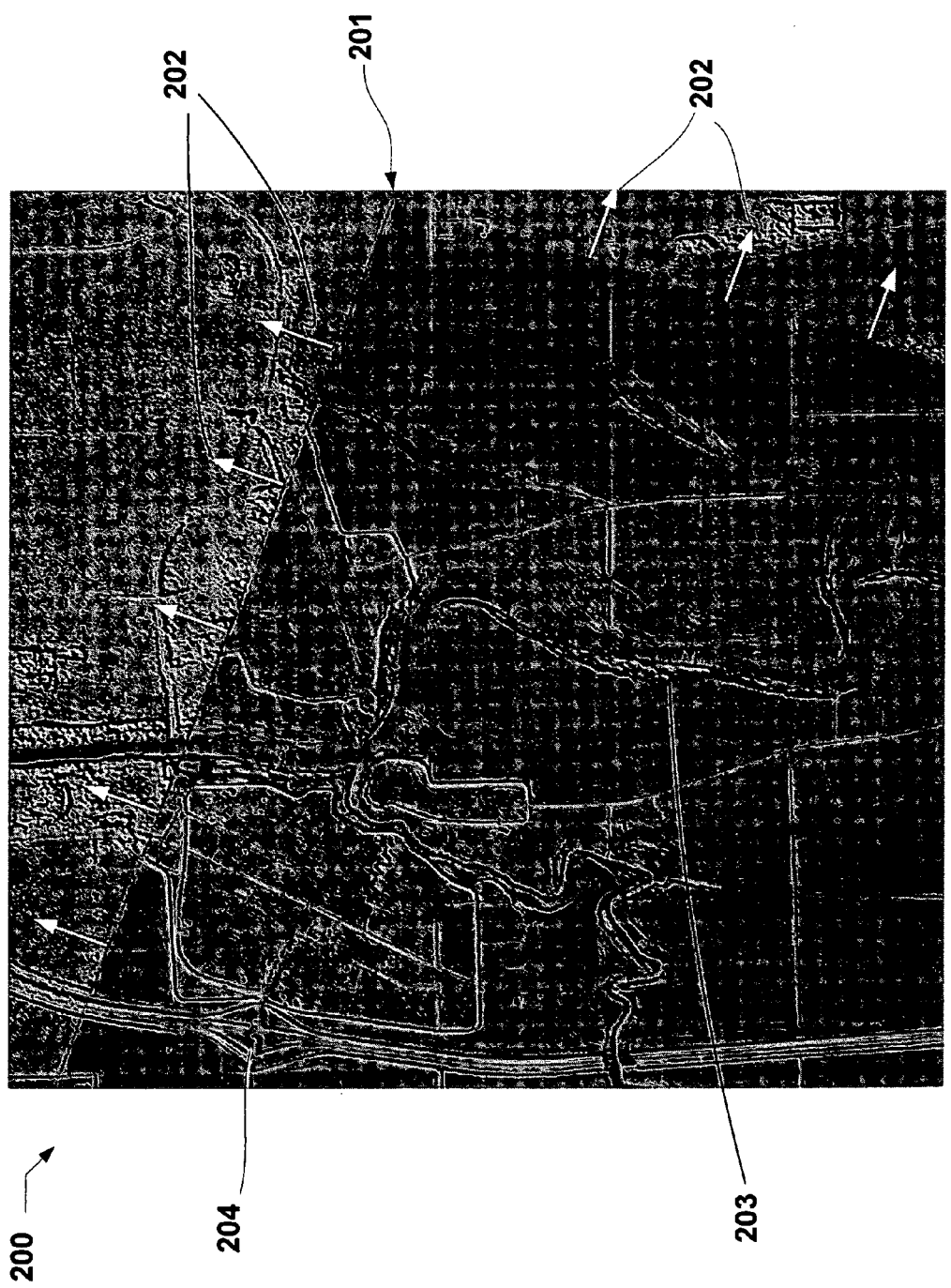
FIG. 2 is a 3-D image developed by conventionally merging data provided by LIDAR and IFSAR.

Refer to FIG. 2, a manually generated grayscale-reproduced image 200 of Red River terrain that includes a river, roads and some features that show minor elevation changes, e.g., the riverbanks 203 and the road interchange 204. The original image (not shown separately) had been colorized by elevation so that, even as a grayscale reproduction, the elevation changes are evident. The image 200 shows white arrows 202 delineating the border between an IFSAR-generated image and a LIDAR-generated image. The IFSAR-generated image is that area towards which the white arrows 202 are pointing. As a reference, the corner 201 of the LIDAR-generated image is marked.

A definite line indicating elevation change along the base of the white arrows 202 is seen. If this merged data were to be used in a hydrologic mathematical model predicting flooding of this area, the water flow of the area along each side of this line would not be modeled correctly. Thus, it is important that the elevation data in the data merged from sources using two different vertical datums be corrected. Note also the difference in the texture between the LIDAR area (smooth) of the image 200 and the IFSAR area (rough). Although this texture difference indicates to the viewer different sources of data, it does not affect the modeling of the composite image 200 as does the elevation change indicated by the line along the base of the white arrows 202.

Figure 3:
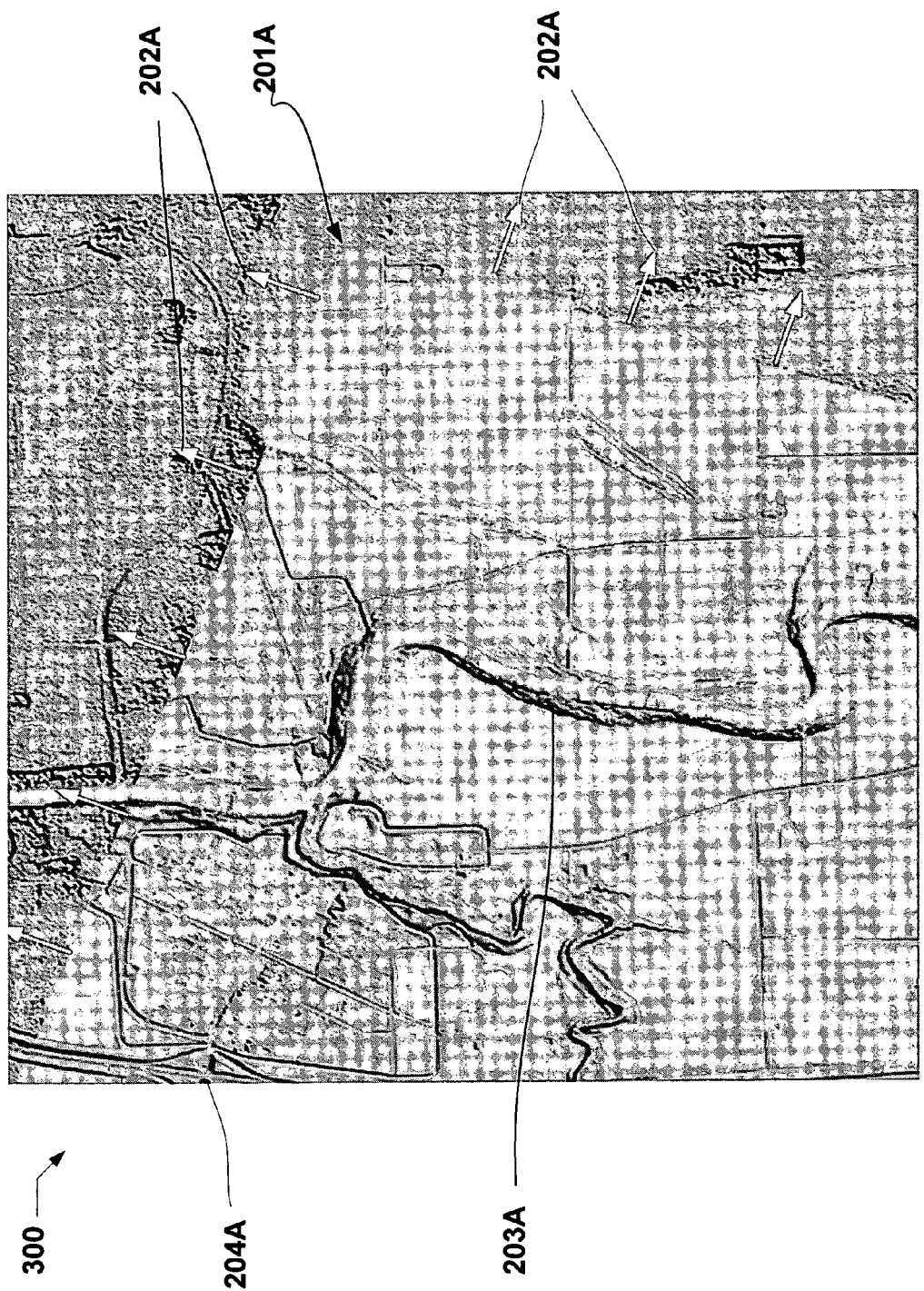
FIG. 3 is the 3-D image of FIG. 2 as it would appear if corrected by a preferred embodiment of the present invention.

Refer to FIG. 3, displaying a manually corrected grayscale image 300 using the same merged data as FIG. 2 to create a colorized image (not shown separately), but corrected as would occur automatically using a preferred embodiment of the present invention. The image 300 also shows white arrows 202A delineating the border between an IFSAR-generated image and a LIDAR-generated image. The IFSAR-generated image is that area towards which the white arrows 202A are pointing. As a reference, the corner 201A of the LIDAR-generated image is marked and appears the same in FIG. 3 as it does in FIG. 2. Note the absence of the line at the base of the white arrows 202A in FIG. 3 in contrast to the line evident in FIG. 2 even though it is obvious to the viewer that different data sources were used because of the differing textures. The riverbanks 203A and the road interchange 204A of FIG. 3 appear the same as in FIG. 2. As mentioned above, the texturing does not affect using this data for further modeling whereas the line at the base of the white arrows 202 of FIG. 2 does affect use of the data for further modeling.

Figure 4:
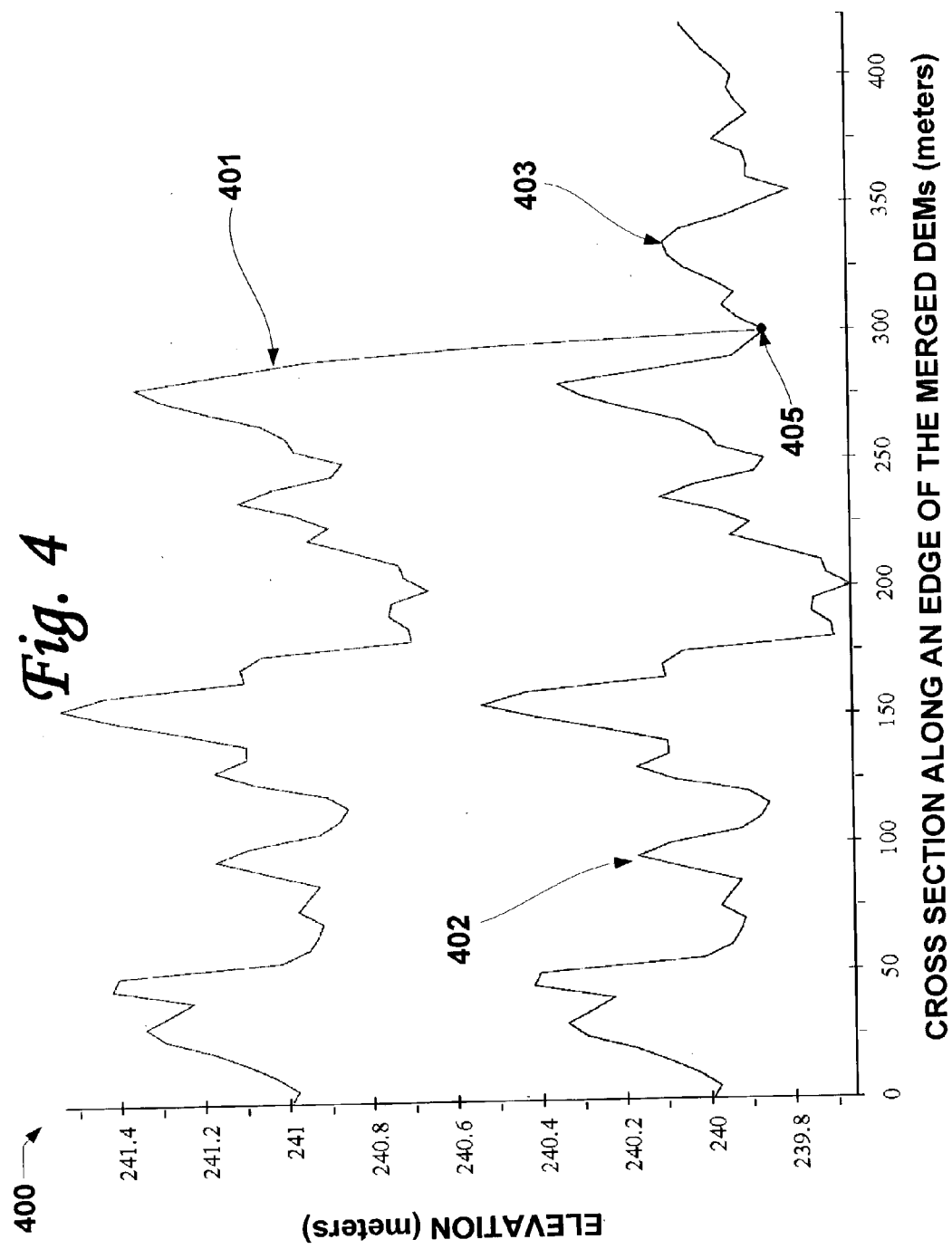
FIG. 4 is a comparison to uncorrected data of data corrected as would occur when using a preferred embodiment of the present invention.

Refer to FIG. 4, a graph 400 showing the "before and after" effects from corrections to data as would be accomplished by a preferred embodiment of the present invention. This is the way a mathematical model "sees" the difference. The top curve 401 represents data from the IFSAR source that has not been corrected in accordance with a preferred embodiment of the present invention. The bottom curve 402 is ISFAR data that have been corrected manually as would occur automatically with a preferred embodiment of the present invention. The point 405 represents a point along the line of FIG. 2, the line touching the bases of the white arrows 202. The curve 403 represents the LIDAR data starting at the point 405 where the two data sources were merged. Note the difference in elevation between the upper curve 401 and the lower curve 402 just prior to the point 405 at which the two data sources merge.

While the invention has been described in terms of its preferred embodiments, those skilled in the art will recognize that the invention may be practiced with modifications within the spirit and scope of the appended claims. For example, although the system is described in specific examples for merging digital element models, it may be applied to any models having differing datums. Thus, it is intended that all matter contained in the foregoing description or shown in the accompanying drawings shall be interpreted as illustrative rather than limiting, and the invention should be defined only in accordance with the following claims and their equivalents.

I claim:

1. A process employing a computer, said process changing an appearance of a boundary between adjacent first and second sections of a map, said first section constructed with data processed with a first mathematical model and said second section constructed with data processed with second mathematical model, said process employing said computer for automatically merging data from said first and second mathematical models each incorporating at least one each horizontal and vertical datums, at least one of either said horizontal or vertical datums differing between said two mathematical models, at least said vertical datums incorporated in a geoid model, comprising:

importing said first and second mathematical models onto said computer for integrating into a geographic information system (GIS) on said computer accessible via said computer;
  automatically determining said at least one each horizontal and vertical datums employed by each said first and second mathematical models;
  automatically projecting each said determined datums to a common three-dimensional (3-D) datum;
  automatically identifying each said geoid model for each said first and second mathematical models;
  automatically determining at least one value of separation between corresponding data points within first and second sets of data points, said first and second sets of data points corresponding to said at least one differing datum in each said first and second mathematical models, respectively;
  automatically applying a correction to said first set of corresponding data points of said first mathematical model based on said determination of said at least one value of separation and retaining said second set of corresponding data points of said second mathematical model unchanged, wherein said correction adjusts for vertical offsets between said first mathematical model and said second mathematical model; and
  employing GIS commands on said computer, automatically fusing into a third mathematical model data on said computer, said third mathematical model representing said corrected first of said mathematical models with data representing said unchanged second of said mathematical models, wherein said third mathematical model changes the appearance of the boundary between said adjacent map sections to allow a viewer of said map to see a realistic representation of the biographical formations of interest along said boundary between said adjacent sections.

2. The process of claim 1 in which said first and second mathematical models are digital elevation models (DEMs), DEM 1 and DEM 2.

3. The process of claim 2 in which sources of data used to build said DEMs are selected from the group consisting essentially of: LIDAR, IFSAR, SAR, SLR, ground mapping radar, ground penetrating radar, an infrared spectrum sensor array, an ultraviolet spectrum sensor array, a visible spectrum sensor array, and combinations thereof.

4. The process of claim 2 further comprising automatically implementing an accuracy assessment consisting of:

providing Global Positioning System (GPS) data for a geographic area in which said DEM 1 and said DEM 2 overlap; and
  using at least one pre-specified statistical algorithm, automatically comparing said provided GPS data to said third mathematical model.

5. The process of claim 4 in which said GPS data have been collected in accordance with the NOAA Technical Memorandum NOS NGS-58.

6. The process of claim 5 in which said GPS data are provided at an accuracy selected from the group consisting of: 10-cm accuracy, 5-cm accuracy, and 2-cm accuracy.

7. The process of claim 5 in which said GPS data are provided at an accuracy of 2-cm.

8. The process of claim 2 further automatically adding at least one geoid model incorporating ellipsoid heights to said third mathematical model,
  wherein said addition of said at least one geoid model facilitates automatically deriving orthometric heights relative to a vertical datum.

9. The process of claim 2 in which determining said separation is accomplished by automatically implementing a difference function defined by DEM 1–DEM 2.

10. The process of claim 4 in which determining said separation is accomplished automatically by first comparing said DEM 1 and said DEM 2 to said GPS data and then automatically correcting DEM 1 to match DEM 2.

11. The process of claim 4 in which automatically determining said separation is accomplished by first comparing said DEM 1 and said DEM 2 to said GPS data and then automatically correcting DEM 2 to match DEM 1.

* * * * *